(12) United States Patent
Courtois De Lourmel et al.

(10) Patent No.: US 11,370,176 B2
(45) Date of Patent: Jun. 28, 2022

(54) METHOD FOR PRODUCING A PART WITH A CAVITY BY ADDITIVE MANUFACTURING

(71) Applicant: SAFRAN LANDING SYSTEMS, Velizy Villacoublay (FR)

(72) Inventors: Yves Courtois De Lourmel, Moissy-Cramayel (FR); Sébastien Messe, Moissy-Cramayel (FR); Gérard Balducci, Moissy-Cramayel (FR); Thierry Caule, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 17/251,350

(22) PCT Filed: Jun. 14, 2019

(86) PCT No.: PCT/EP2019/065751
§ 371 (c)(1),
(2) Date: Dec. 11, 2020

(87) PCT Pub. No.: WO2019/238951
PCT Pub. Date: Dec. 19, 2019

(65) Prior Publication Data
US 2021/0252794 A1 Aug. 19, 2021

(30) Foreign Application Priority Data
Jun. 15, 2018 (FR) ...................................... 1855287

(51) Int. Cl.
*B33Y 80/00* (2015.01)
*B29C 64/40* (2017.01)
(Continued)

(52) U.S. Cl.
CPC .............. *B29C 64/40* (2017.08); *B29C 64/10* (2017.08); *B33Y 10/00* (2014.12); *B33Y 80/00* (2014.12)

(58) Field of Classification Search
CPC ....... B29C 64/40; B29C 64/10; B29C 64/153; B33Y 10/00; B33Y 80/00; B22F 10/40; B22F 10/20; Y02P 10/25
See application file for complete search history.

(56) References Cited

U.S. PATENT DOCUMENTS 9,636,869 B2    5/2017  Kroll et al.
2016/0200051 A1  7/2016  Urbanic
(Continued)

FOREIGN PATENT DOCUMENTS

DE    10 2010 046 579 A1   3/2012
ER       3 026 638 B1      6/2016

OTHER PUBLICATIONS

International Search Report for PCT/EP2019/065751, dated Sep. 4, 2019.

*Primary Examiner* — Rick K Chang
(74) *Attorney, Agent, or Firm* — Sughrue Mion, PLLC

(57) ABSTRACT

A method of additive manufacturing including defining contiguous portions over a ceiling of a cavity of a part, including a central portion defined entirely by first edges, and peripheral portions defined by second edges and by a portion of a frontier of the ceiling. Defining a capital by facets that bear against the first edges and that converge towards an apex, and defining a slender support that extends from the capital to a cavity floor while being centered on the apex. For each peripheral portion, defining a capital by facets that bear against the second edges and that converge towards a terminal edge extending in a plane that is normal to a wall of the cavity, and defining a rib support that extends in the normal plane between the terminal edge and a wall of (Continued)

the cavity. Manufacturing the part including the cavity while making the supports and capitals.

3 Claims, 2 Drawing Sheets

(51) Int. Cl.
*B29C 64/10* (2017.01)
*B33Y 10/00* (2015.01)

(56) References Cited

U.S. PATENT DOCUMENTS

2018/0361096 A1* 12/2018 Grashow ................ A61B 5/107
2019/0117408 A1*  4/2019 Willis .................... B22F 3/24
2019/0209345 A1*  7/2019 LaChappelle ............ A61F 2/72
2021/0077267 A1*  3/2021 Morrison ................ A61F 2/447

* cited by examiner

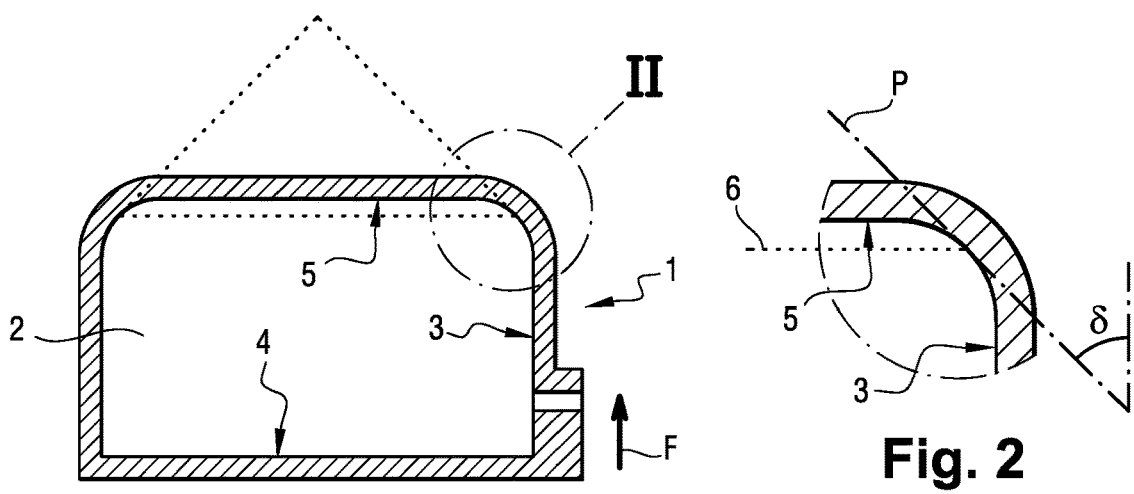
Fig. 1
Fig. 2
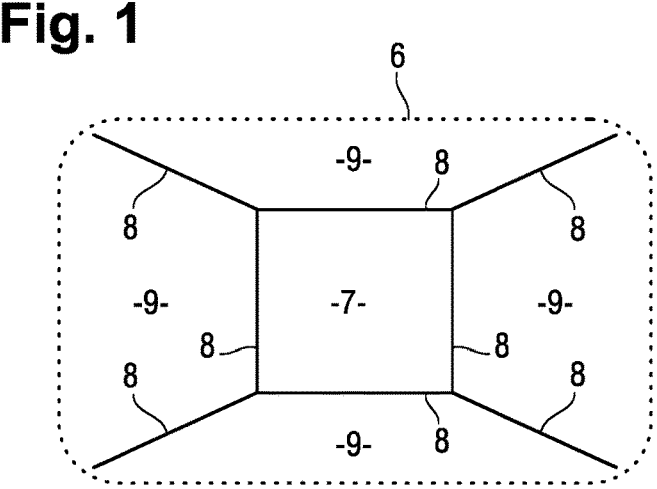
Fig. 3
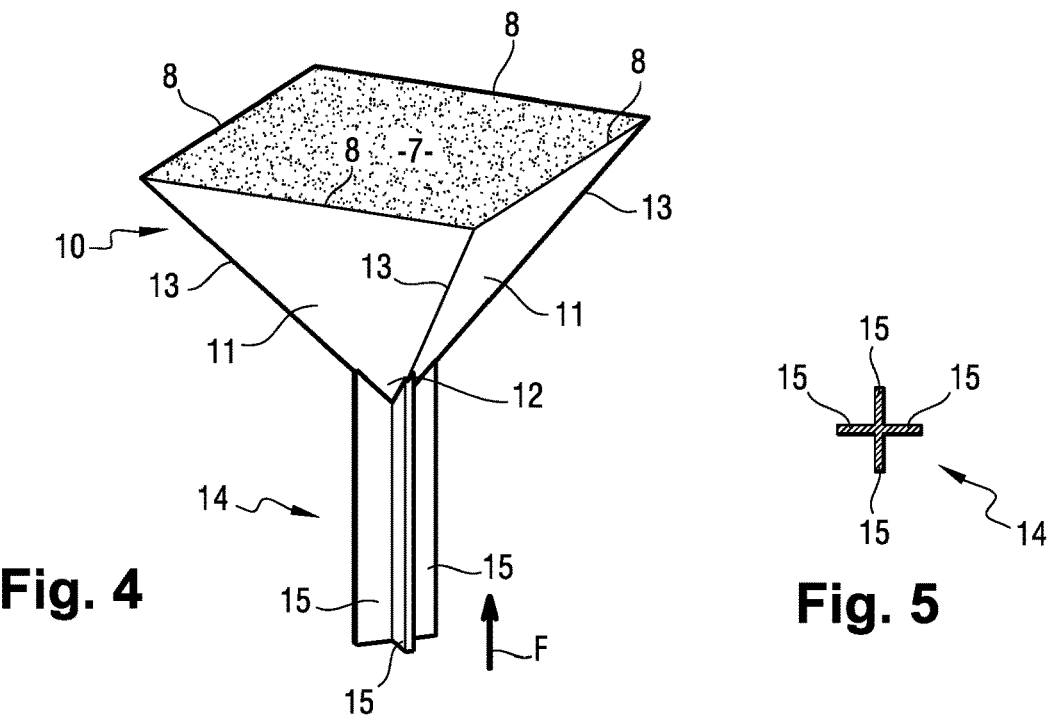
Fig. 4
Fig. 5

METHOD FOR PRODUCING A PART WITH A CAVITY BY ADDITIVE MANUFACTURING

CROSS REFERENCE TO RELATED APPLICATIONS

This application is a National Stage of International Application No. PCT/EP2019/065751 filed Jun. 14, 2019, claiming priority based on French Patent Application No. 18 55287 filed Jun. 15, 2018, the entire contents of each of which are herein incorporated by reference in their entireties.

The invention relates to a method of making a part with a cavity by additive manufacturing.

BACKGROUND OF THE INVENTION

Additive manufacturing methods (of the electron beam melting or the selective laser melting type) for making a part consist in progressively solidifying a powder material in layers that build up in a buildup direction (or manufacturing direction), and the use of additive manufacturing for making a part with a cavity suffers from limitations concerning acceptable overhang angles. Under such circumstances, a cavity of large size needs to have a ceiling that is vaulted in order to comply with such overhang angle constraints, thereby increasing both the internal and the external volume of the cavity. Nevertheless, certain parts have constraints in terms of volume and size, and it is not possible to envisage such a cavity with a ceiling that is vaulted. In order to make a cavity with a ceiling that, although not flat, is vaulted little, additive manufacturing software very often includes a function enabling supports in the shape of columns to be created while manufacturing the part in order to support the ceiling of the cavity while it is being manufactured. Nevertheless, the columns occupy a considerable volume, and for cavities that are semi-closed, or that are open to the outside solely via a fluid inlet channel, it is not possible to eliminate such columns.

OBJECT OF THE INVENTION

The invention seeks to provide a method of making a part with a cavity by additive manufacturing, the method serving to minimize the volume occupied by the supports that support the ceiling and that are to remain permanently.

SUMMARY OF THE INVENTION

In order to achieve this object, there is provided a method of making a part with a cavity by additive manufacturing, the method comprising the steps of:
  defining contiguous portions over the ceiling of the cavity, including at least one central portion defined entirely by edges, and peripheral portions defined by edges and by a portion of a frontier of the ceiling;
  for the central portion, defining a capital by means of facets that bear against the edges defining the central portion and that converge towards an apex, and also defining a slender support that extends from the capital to a floor of the cavity while being centered on the apex;
  for each peripheral portion, defining a capital by means of facets that bear against the edges defining said peripheral portion and that converge towards a terminal edge extending in a plane that is substantially normal to a wall of the cavity, and also defining a support in the form of a rib that extends in the normal plane between the terminal edge of the capital and the wall of the cavity; and
  manufacturing the part including the cavity while making the above-defined supports and capitals.

The outline of the ceiling may be defined sharply by edges that define the ceiling and the wall of the cavity. If this boundary is not sharp, e.g. because of the presence of a connecting fillet, the outline is defined by determining a perimeter from which the overhang angle exceeds a predetermined limit.

Preferably, the slender support presents a star-shaped section with branches extending in respective planes containing receding lines between the facets of the capital.

DESCRIPTION OF THE FIGURES

The invention can be better understood in the light of the following description of a particular implementation of the invention, given with reference to the figures of the accompanying drawings, in which:
FIG. 1 is a diagrammatic section view of a part including a cavity;
FIG. 2 is a detailed view of the boundary between the wall and the ceiling of the cavity;
FIG. 3 is a view of the ceiling subdivided into portions;
FIG. 4 is a view of a capital and of its support column made under the central portion;
FIG. 5 is a section of the support column shown in FIG. 4.

DETAILED DESCRIPTION OF THE INVENTION

Figure 6:
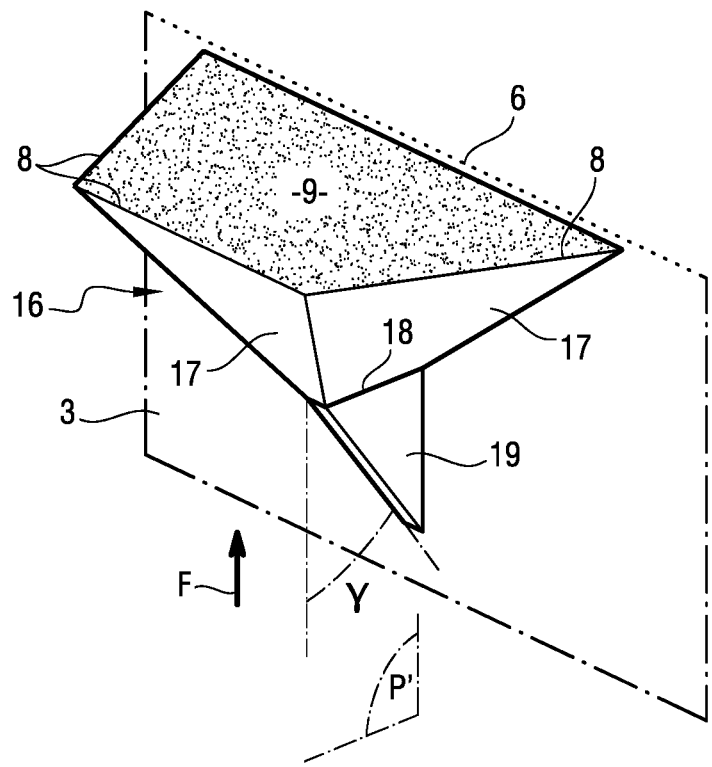
FIG. 6 is a view of a capital and of its support rib made under a peripheral portion.

Below, the buildup direction (or manufacturing direction, given reference F in the figures) corresponds to the direction in which successive layers of material are built up by the additive manufacturing machine used for manufacturing the part described in detail herein. The buildup direction is usually the vertical direction.

With reference to FIG. 1, the method concerns using additive manufacturing to make a part 1 including a cavity 2 that is defined by a side wall 3, a floor 4, and a ceiling 5. In this example, the cavity 2 is almost closed, with the exception of the outlet of a fluid supply channel, so it is not possible to access the cavity 2 once the part has been manufactured. The ceiling 5 shown in this example cannot be manufactured by an additive manufacturing machine that accepts an overhang angle δ, which is typically equal to 45°. Specifically, the central portion of the ceiling 5 presents an overhang angle that is much too large for it to be possible to produce the part by building up successive layers. Complying with that overhang angle would lead to a ceiling having the shape as shown in dotted lines in FIG. 1, thereby considerably increasing the external volume of the part. The invention thus seeks to enable parts to be made with cavities, but with smaller external size. In order to achieve this object, the following steps are performed, in practice by means of manufacturing software adapted to read a definition file of the part:
  where necessary, a frontier is determined for the ceiling 5 in the form of an outline 6 defining it. If the ceiling 5 is defined by sharp edges, these sharp edges are used as the outline. If, as shown in FIG. 2, the ceiling 5 and the side wall 3 of the cavity are connected together by a connecting fillet, then the outline 6 is taken as the perimeter along which the plane P tangential to the cavity forms an angle relative to the buildup direction that is equal to the overhang angle δ. FIG. 3 shows the outline 6 as geometrically determined in this way. Thereafter, the ceiling 4 as defined in this way is subdivided into continuous portions, including a central portion 7 that is completely defined by edges 8, and peripheral portions 9 that are defined both by edges 7 and also by respective portions of the outline 6;

as can be seen in FIG. 4, a capital 10 is defined under the central portion 7 by means of facets 11 that bear against the edges 8 that define the central portion 7 and that converge towards an apex 12. Each of the facets 11 forms an angle relative to the buildup direction that is no greater than the overhang angle. Between one another, the facets 11 are defined by receding lines 13. Thereafter, a support 14 is defined in the form of a column of constant section that is centered on the apex 12 and that extends in the buildup direction from the capital 10 to the floor 3. As can be seen in FIG. 5, the section of the support 14 is star-shaped with branches (flat branches 15 in this example) that extend in planes, each containing one of the receding lines 13. Specifically in this example, the capital 10 is in the shape of an upside down pyramid having four facets 11, and the support 14 has a cruciform star-shaped section;

as can be seen in FIG. 6, a respective capital 16 is defined under each of the peripheral portions 9 by means of facets 17 that bear against the edges 8 that define the corresponding peripheral portion and that converge towards a terminal rib 18 that, in this example, extends in a plane P' normal to the wall 3 of the cavity 2 and that contains the buildup direction. Each of the facets 17 forms an angle relative to the vertical axis that is no greater than the overhang angle δ. Thereafter, a support 19 is defined in the form of a rib of constant section that extends in the normal plane P' between the terminal edge 18 of the capital 16 and the wall 3 of the cavity. The slope y of the free edge of the rib 19 relative to the buildup direction is no greater than the overhang angle δ.

The part is then manufactured by additive manufacturing, by building up successive layers to make the supports 14 and 19 and the capitals 10 and 16 at the same time as making the wall 3. This serves to limit the height of the ceiling of the cavity, but at the cost of reinforcing elements being present in the cavity. The presence of these reinforcing elements reduces the volume of the cavity, and it might be necessary to modify the shape of the cavity in order to ensure that it has the same desired volume in spite of the presence of the reinforcing elements. The thickness of the sections of the branches of a column 14 and of the ribs 19 naturally needs to be determined as a function of the capabilities of the manufacturing machine. It is advantageous to set the width of the branches and of the ribs to a minimum value in order to save on material and to minimize the impact on the volume of the cavity, while nevertheless enabling capitals to be manufactured on tops of the column and of the ribs.

Figure 7:
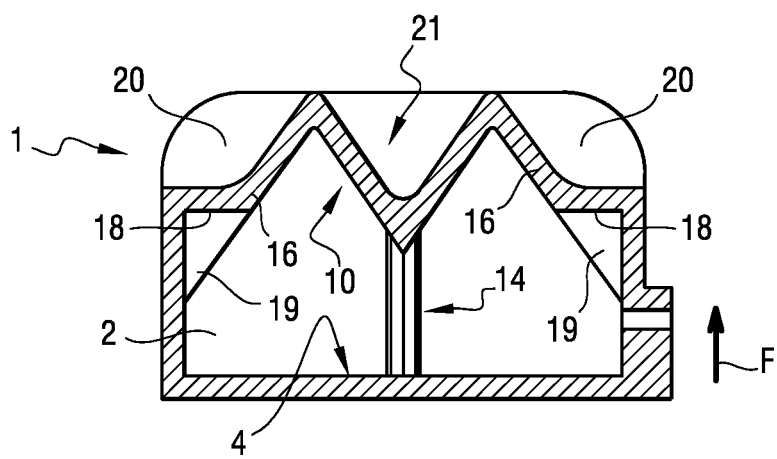
FIG. 7 is section view of a part complying with the diagram of FIG. 1 and made using the method of the invention.

As shown in FIG. 7, it is naturally possible for the capitals 10 and 16 to be made hollow in order to lighten the part and save on material. Providing the outside shape of the part in register with the capitals is not essential, this gives rise to peripheral and central hollows 20 and 21 above the capitals. It is always possible for the hollows to be filled in by building up material if the outside shape is essential.

The invention is not limited to the above description, but on the contrary covers any variant coming within the ambit defined by the claims. In particular, although in the example shown, the slender support of the central zone is a column of star-shaped section with flat branches, any other type of slender support could be used, e.g. such as a cylindrical column of circular section, a conical column, or indeed an openwork column, providing it starts from the apex of the capital and extends to the floor of the cavity. Although above, only one central portion is shown in the subdivision of the ceiling, the central zone of the ceiling could be subdivided into a plurality of portions in order to reduce the surface areas of the portions and thus the height of the associated capitals, which would imply that a plurality of slender supports are present.

The invention claimed is:

1. A method of making a part with a cavity by additive manufacturing, the method comprising:
    defining contiguous portions over a ceiling of the cavity, including at least one central portion defined entirely by edges, and peripheral portions defined by edges and by a portion of a frontier of the ceiling;
    for the central portion, defining a capital by means of facets that bear against the edges defining the central portion and that converge towards an apex, and also defining a slender support that extends from the capital to a floor of the cavity while being centered on the apex;
    for each of the peripheral portions, defining a capital by means of facets that bear against the edges defining the peripheral portions and that converge towards a terminal edge extending in a plane that is normal to a wall of the cavity, and also defining a rib-shaped support that extends in the plane between the terminal edge and the wall of the cavity; and
    manufacturing the part including the cavity while making the supports and the capitals of the central portion and of the peripheral portions.

2. The method according to claim 1, wherein the slender support presents a star-shaped section with branches that extend in respective planes containing receding lines between the facets of the capital.

3. The method according to claim 2, wherein the branches of the slender support are flat.

* * * * *